(12) United States Patent
Dowty

(10) Patent No.: US 12,187,435 B2
(45) Date of Patent: Jan. 7, 2025

(54) DOOR ASSEMBLY WITH STANDARD AND ACCESSIBLE OPERATING MODES

(71) Applicant: B/E Aerospace, Inc., Winston-Salem, NC (US)

(72) Inventor: Mark B. Dowty, Rural Hall, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 205 days.

(21) Appl. No.: 17/833,603

(22) Filed: Jun. 6, 2022

(65) Prior Publication Data

US 2023/0391441 A1 Dec. 7, 2023

(51) Int. Cl.
| B64D 11/06 | (2006.01) |
| E05B 65/08 | (2006.01) |
| E05C 3/00 | (2006.01) |
| E05C 9/04 | (2006.01) |

(52) U.S. Cl.
CPC .......... B64D 11/0606 (2014.12); E05B 65/08 (2013.01); E05C 3/004 (2013.01); E05C 9/04 (2013.01)

(58) Field of Classification Search
CPC ............................ B64D 11/0606; E06B 3/921
See application file for complete search history.

(56) References Cited

U.S. PATENT DOCUMENTS

| 2,910,743 | A | * | 11/1959 | Muhn | ..................... E06B 7/084 49/90.1 |
| 9,920,559 | B2 | | 3/2018 | Druckman et al. | |
| 10,562,633 | B2 | | 2/2020 | Kuyper et al. | |
| 11,084,587 | B2 | | 8/2021 | Robinson | |
| 2005/0125891 | A1 | * | 6/2005 | Stratmann | ............. E04H 1/1216 4/661 |
| 2014/0123571 | A1 | | 5/2014 | Swain | |
| 2016/0298370 | A1 | * | 10/2016 | Druckman | .......... E05D 15/0656 |
| 2019/0329891 | A1 | | 10/2019 | Bonnefoy et al. | |
| 2021/0039790 | A1 | | 2/2021 | Robinson | |
| 2021/0179254 | A1 | | 6/2021 | Scotford et al. | |
| 2021/0179271 | A1 | | 6/2021 | Senechal et al. | |

(Continued)

FOREIGN PATENT DOCUMENTS

| WO | 2021084470 A1 | 5/2021 |
| WO | 2021084474 A1 | 5/2021 |

OTHER PUBLICATIONS

Extended European Search Report dated Oct. 12, 2023; European Application No. 23176847.4.

*Primary Examiner* — Joshua J Michener
*Assistant Examiner* — Arfan Y. Sinaki
(74) *Attorney, Agent, or Firm* — Suiter Swantz IP

(57) ABSTRACT

A door assembly for use in an aircraft providing standard and accessible operating modes. The assembly includes a partition wall movable between a first position and a second position, a sliding door including a first door portion and a second door portion, and a latch mechanism operable to couple the first and second door portions. In a first operating mode of the door assembly, the partition wall is maintained in the first position and the sliding door moves to an open state to form a first opening. In a second operating mode of the door assembly, the partition wall is moved from the first position to the second position and the sliding door moves to an open state to form a second opening different from the first opening.

15 Claims, 11 Drawing Sheets

(56) References Cited

U.S. PATENT DOCUMENTS

| | | |
|---|---|---|
| 2022/0009636 A1 | 1/2022 | Frost et al. |
| 2022/0063809 A1 | 3/2022 | Thomas et al. |
| 2023/0365261 A1* | 11/2023 | Yates ................ B64D 11/0606 |

* cited by examiner

DOOR ASSEMBLY WITH STANDARD AND ACCESSIBLE OPERATING MODES

TECHNICAL FIELD AND BACKGROUND

The present disclosure relates generally to door assemblies for use in aircraft and other conveyances, and more particularly to a door assembly providing a first entrance for standard use and a different second entrance for accessible use.

Aircraft and other passenger conveyances are typically divided into different seating classes. Each seating class typically includes features and accommodations commensurate with the fares paid. For example, passengers in economy seating classes are typically closely spaced without any physical separation, whereas passengers in premium seating classes may be spaced apart and separated by physical dividers. Some premium seating classes include individual passenger suites in which suite access is provided through a dedicated entrance.

Door solutions aboard aircraft and other conveyances typically include a swinging or sliding door. Swinging doors require space within the compartment or aisle to accommodate the length of the door to permit the door to be swung open and closed. Sliding doors require space forward or aft of the doorway to receive the door when open. In aircraft, where space is at a premium and aisle obstructions are to be avoided, swinging doors and sliding doors having a long length are undesirable.

While small openings and comparatively short length doors can accommodate most traveling passengers, passengers of reduced mobility and those requiring a wheelchair are not able to fit through a standard doorway and therefore require a different solution for suite access.

Accordingly, what is needed is a door solution capable of forming different entrances as needed.

BRIEF SUMMARY OF THE INVENTION

To achieve the foregoing and other advantages, in a first aspect the inventive concepts of the present disclosure are directed to a door assembly for use in a doorway in an aircraft, other conveyance, or elsewhere. The door assembly includes a partition wall configured to move between a first position and a second position, a sliding door including a first door portion and a second door portion, and a latch mechanism operable to couple the first and second door portions. In use, in a first operating mode of the door assembly the partition wall is maintained in the first position and the sliding door moves to an open state to form a first opening, and in a second operating mode of the door assembly the partition wall is moved from the first position to the second position and the sliding door moves to an open state to form a second opening different from the first opening. The first opening is not achievable in the second operating mode of the door assembly and the second opening is not achievable in the first operating mode of the door assembly.

In some embodiments, the first operating mode corresponds to standard use and the second operating mode corresponds to accessible use, and wherein the second opening is longitudinally shifted relative to the first opening.

In some embodiments, the first and second openings have a substantially equal width dimension or wherein a width dimension of the second opening is greater than a width dimension of the first opening.

In some embodiments, in the first operating mode of the door assembly, the first and second door portions uncouple, and the first door portion moves relative the second door portion.

In some embodiments, in the first operating mode of the door assembly, the first and second door portions are coupled and move together relative to the partition wall.

In some embodiments, in the second operating mode of the door assembly, the first and second door portions uncouple, and the first door portion moves relative to the second door portion.

In some embodiments, in the second operating mode of the door assembly, the first and second door portions are coupled and move together relative to the partition wall.

In some embodiments, the latch mechanism includes a rotating lever and a bevel gear configuration.

According to another aspect, the inventive concepts of the present disclosure are directed to a passenger suite including a partition wall defining an interior space, a passenger seat positioned in the interior space, an entrance formed between the partition wall and a spaced structure, and a door assembly. The door assembly includes a movable partition wall configured to move between a first position and a second position, a sliding door including a first door portion and a second door portion, and a latch mechanism operable to couple the first and second door portions. In use, in a first operating mode of the door assembly the movable partition wall is maintained in the first position and the sliding door moves to an open state to form a first opening, and in a second operating mode of the door assembly the movable partition wall is moved from the first position to the second position and the sliding door moves to an open state to form a second opening different from the first opening.

Benefits of the embodiments described herein include a door assembly configured to form a first entrance during standard use of the door and a second entrance during accessible use of the door, wherein the second entrance is not merely an expansion of the first entrance.

BRIEF DESCRIPTION OF THE DRAWINGS

Implementations of the inventive concepts disclosed herein may be better understood when consideration is given to the following detailed description thereof. Such description refers to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings.

DETAILED DESCRIPTION

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities. The aspects, features and functions described below in connection with one embodiment are intended to be applicable to the other embodiments described below except where expressly stated or where an aspect, feature or function is incompatible with an embodiment.

Broadly speaking, the present disclosure provides a door assembly for use in an aircraft, other conveyances, and elsewhere to provide access into a dedicated space, for instance a passenger suite, compartment, lavatory, etc. In use, the door assembly is configured to operate in different modes, wherein a first mode corresponds to standard use by passengers without mobility limitations, and the second mode corresponds to accessible use by passengers with mobility limitations, for instance passengers using a wheelchair or other assistance device. In embodiments, the majority of use may be standard use whereas the accessible use may be occasional. In the first mode the door assembly forms a first entrance or door opening. In the second mode the door assembly forms a second entrance or door opening different from the first entrance. The second entrance is longitudinally shifted as compared to the first entrance, i.e., the second entrance is not present in the first operating mode of the door assembly and the first entrance is not present in the second operating mode of the door assembly. As such, the second entrance is not an extension of the first entrance. The door assembly is further configured to form modified versions of the first and second entrances.

Figure 1:
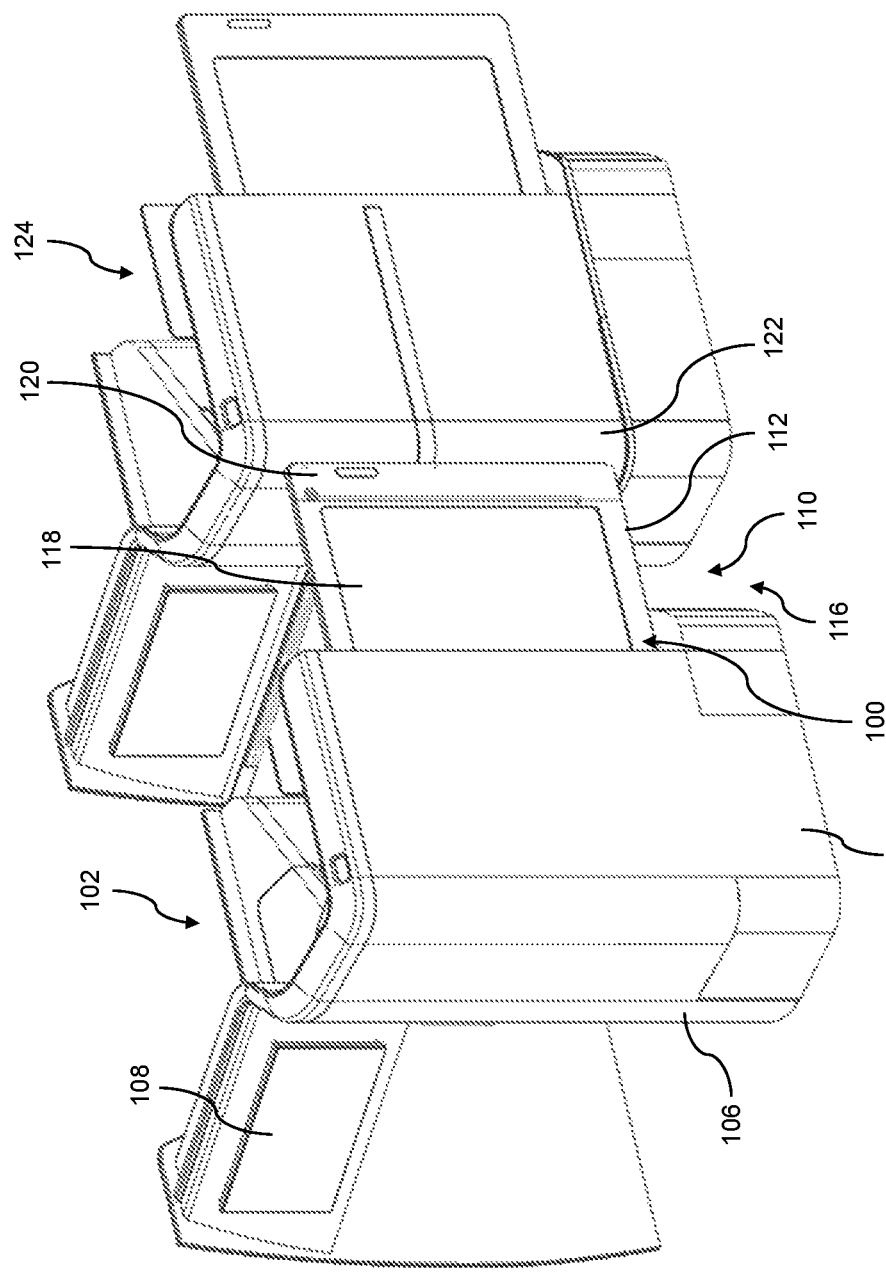
FIG. 1 is a perspective view of exemplary passenger suites equipped with a door assembly according to the present disclosure, showing the door in a fully closed condition.
Figure 2:
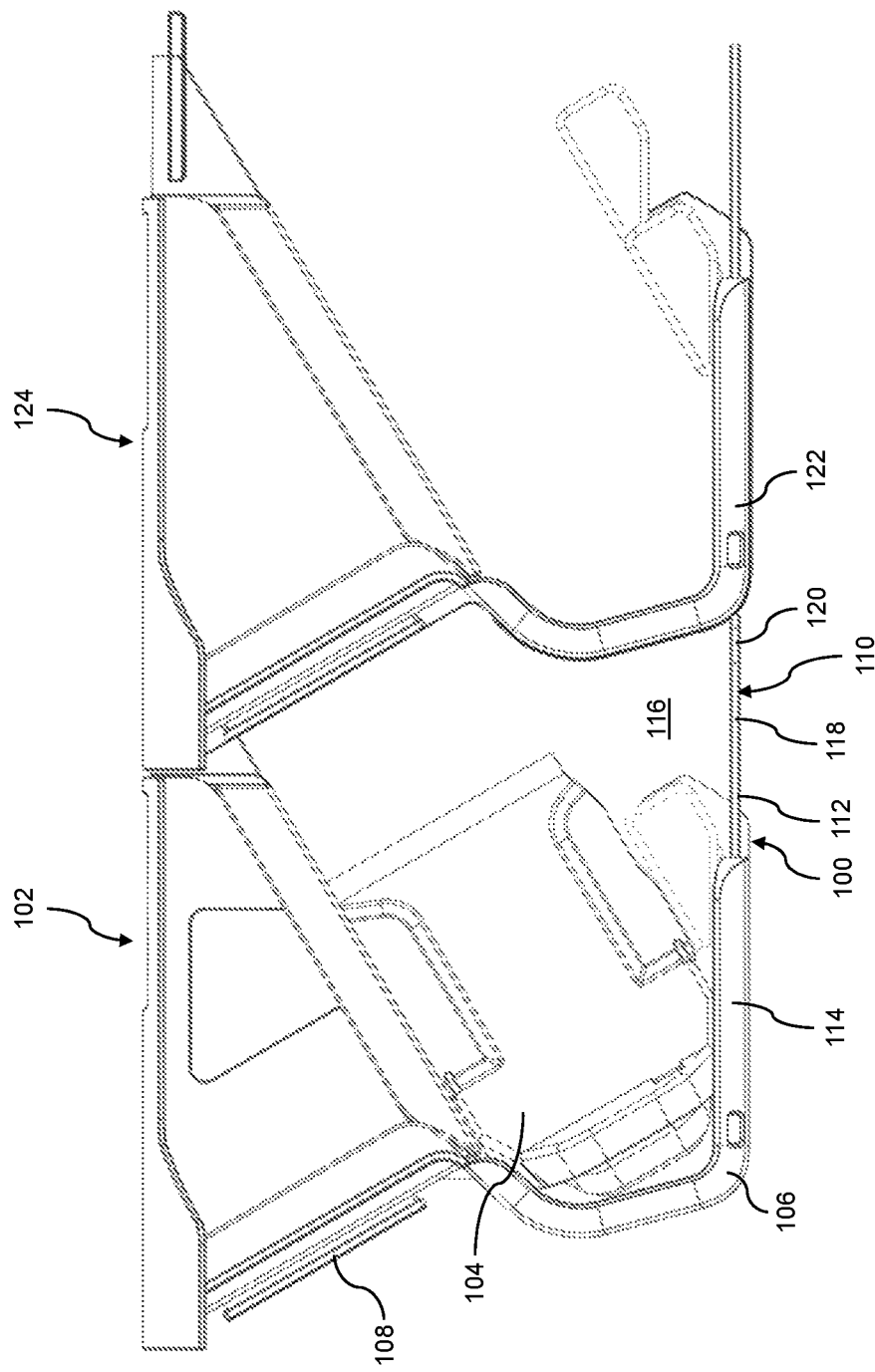
FIG. 2 is an overhead view of FIG. 1.

Referring to FIGS. 1 and 2, a door assembly according to the present disclosure is shown generally at reference numeral 100. The door assembly 100 is shown, for example, utilized with an entrance of a passenger suite 102 in an aircraft. The passenger suite 102 may be part of a larger seating arrangement including a plurality of adjacent passenger suites. As shown, a portion of the passenger seating arrangement includes longitudinally adjacent passenger suites positioned laterally adjacent an aisle, for instance a longitudinal aisle parallel to an aircraft longitudinal axis. In some embodiments, each suite extends from the longitudinal aisle to the fuselage. In use, the door assembly 100 operates to provide access into the suite 102 and closes for privacy. In some embodiments, the passenger suite 102 includes a passenger seat 104 and at least one passenger amenity positioned in the suite.

The passenger suite 102 is defined, at least in part, by at least one partition wall 106. As shown, a portion of the partition wall 106 extends along the aisle and a further portion of the partition wall extends behind the passenger seat 104. In some embodiments, like partition walls 106 are repeated along the longitudinal length of the passenger cabin for efficiency and to separate and define individual passenger suites. Further portions of the partition wall 106 may define other spaces within the suite and support mounted structures such as video monitors 108. In some embodiments, the portion of the partition wall 106 extending along the aisle also extends along a portion of the passenger seat 104. As shown, the passenger seat 104 is angled away from the aisle; however, other seat angles are envisioned such as parallel and angled toward the aisle.

The suite entrance 110 is generally positioned between spaced partition walls, for instance between a first partition wall 106 associated with a first suite and a spaced apart and longitudinally adjacent second partition wall 122 associated with a second suite 124. In some embodiments, the first partition wall may be associated with the first passenger suite 102 and the second partition wall may be associated with a monument, bulkhead, lavatory, etc. positioned longitudinally adjacent the first passenger suite. The suite entrance 110 provides ingress and egress directly from the longitudinal aisle such that each suite may have its own dedicated entrance.

With continued reference to FIG. 1, the door assembly 100 generally includes a sliding door 112 and a moveable partition wall 114 configured to support and interact with the door. As shown, a bottom edge of the door 112 is spaced above the floor 116. In use, the door 112 translates substantially horizontally forward and aft between open and closed conditions of the door. Assuming the passenger seat 104 is oriented forward facing, the door 112 translates horizontally aft to open and translates horizontally forward to close. The partition wall 106 may extend from the floor 116 to a predetermined height above the floor, preferably above the height of the passenger seat 104 to enhance privacy for the suite occupant.

The door assembly 100 generally includes a movable portion of the partition wall 114, the door 112, and a latch mechanism as described further below. The door 112 generally includes a first door portion 118 and a second door portion 120, wherein the first and second door portions are configured to be coupled or decoupled depending on the entrance or door opening to be formed. FIGS. 1 and 2 show the first and second door portions 118, 120 in a coupled state and fully closed. In the fully closed condition, the second door portion 120 closest the second partition wall 122 may be attached to or positioned proximal the second partition wall, depending on the safety requirements of the door. When the door 112 is in the fully closed condition, the first door portion 118 is disposed substantially outside and forward of the partition wall 114, and the second door portion 120 is disposed entirely outside of and forward of the partition wall 114. In some embodiments, each of the first and second door portions 118, 120 are rigid panels having a unitary or combinatorial construction. In other embodiments, at least one of the panels are flexible for emergency egress.

Figure 3:
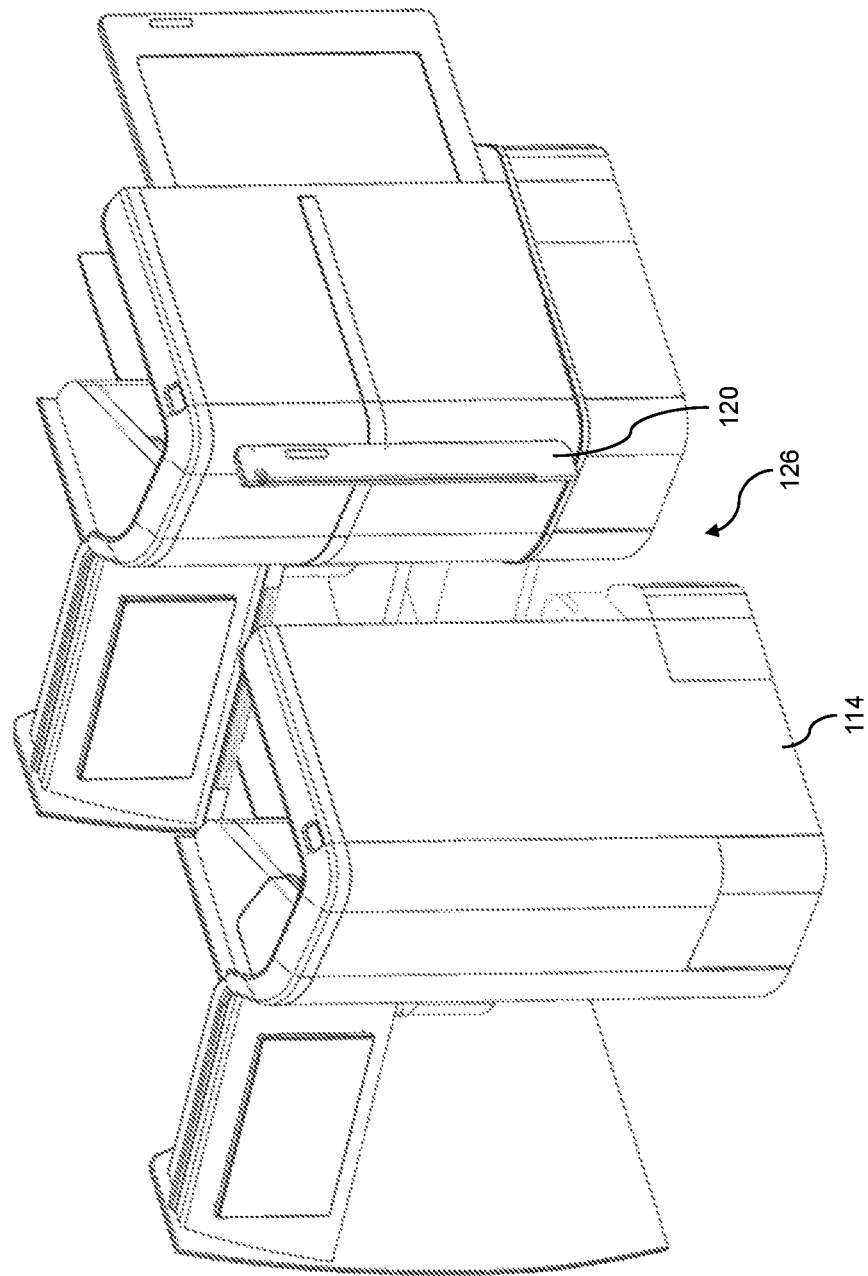
FIG. 3 is a perspective view of the passenger suites of FIG. 1 showing the door forming a first entrance for standard use.
Figure 4:
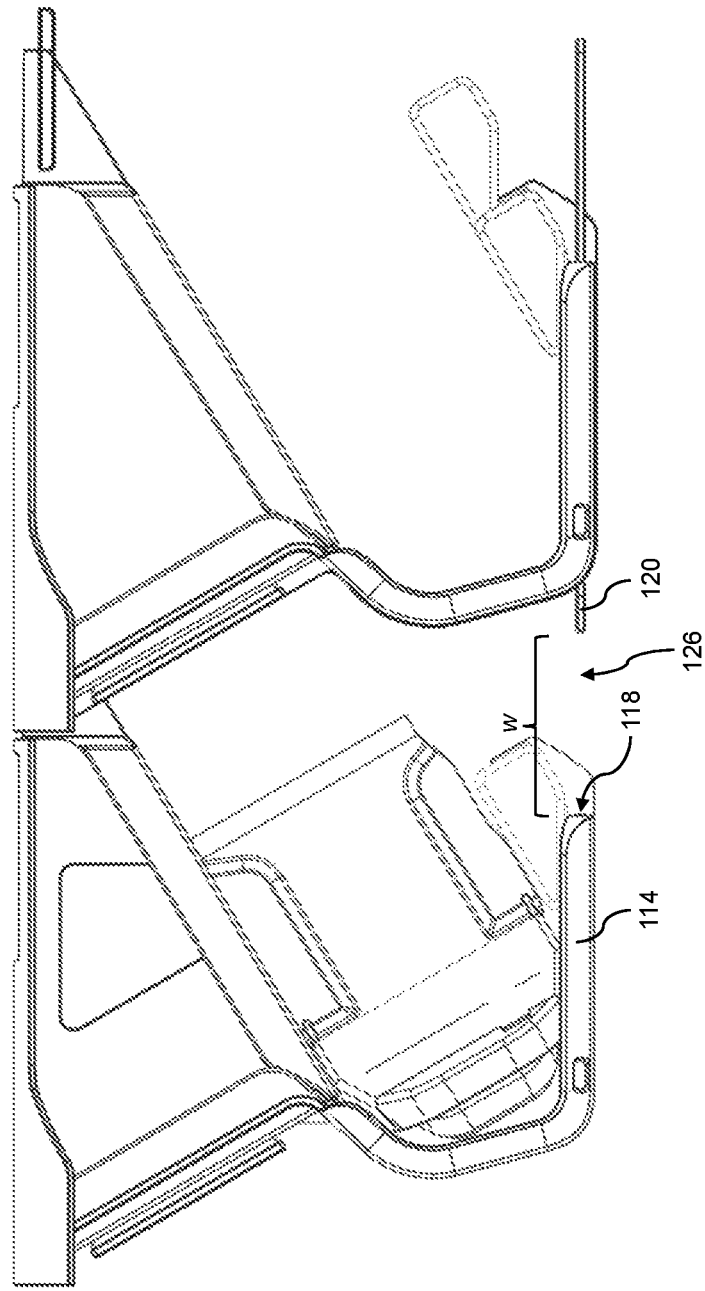
FIG. 4 is an overhead view of FIG. 3.

Referring to FIGS. 3 and 4, in a first operating mode the first door portion 118 decouples from the second door portion 120, via a latch mechanism, and translates or otherwise moves apart from the second door portion 120 to form a first entrance or door opening 126. The first entrance 126 is formed between the facing edges of the spaced first and second door portions 118, 120. Alternatively, the first entrance 126 may be formed between the stationary second door portion 120 and the facing edge of the partition wall 114 when the first door portion 118 fully retracts into the partition wall. As shown, the first entrance 126 has a first width dimension w that corresponds to a standard entrance for use by passengers without mobility limitations.

Figure 5:
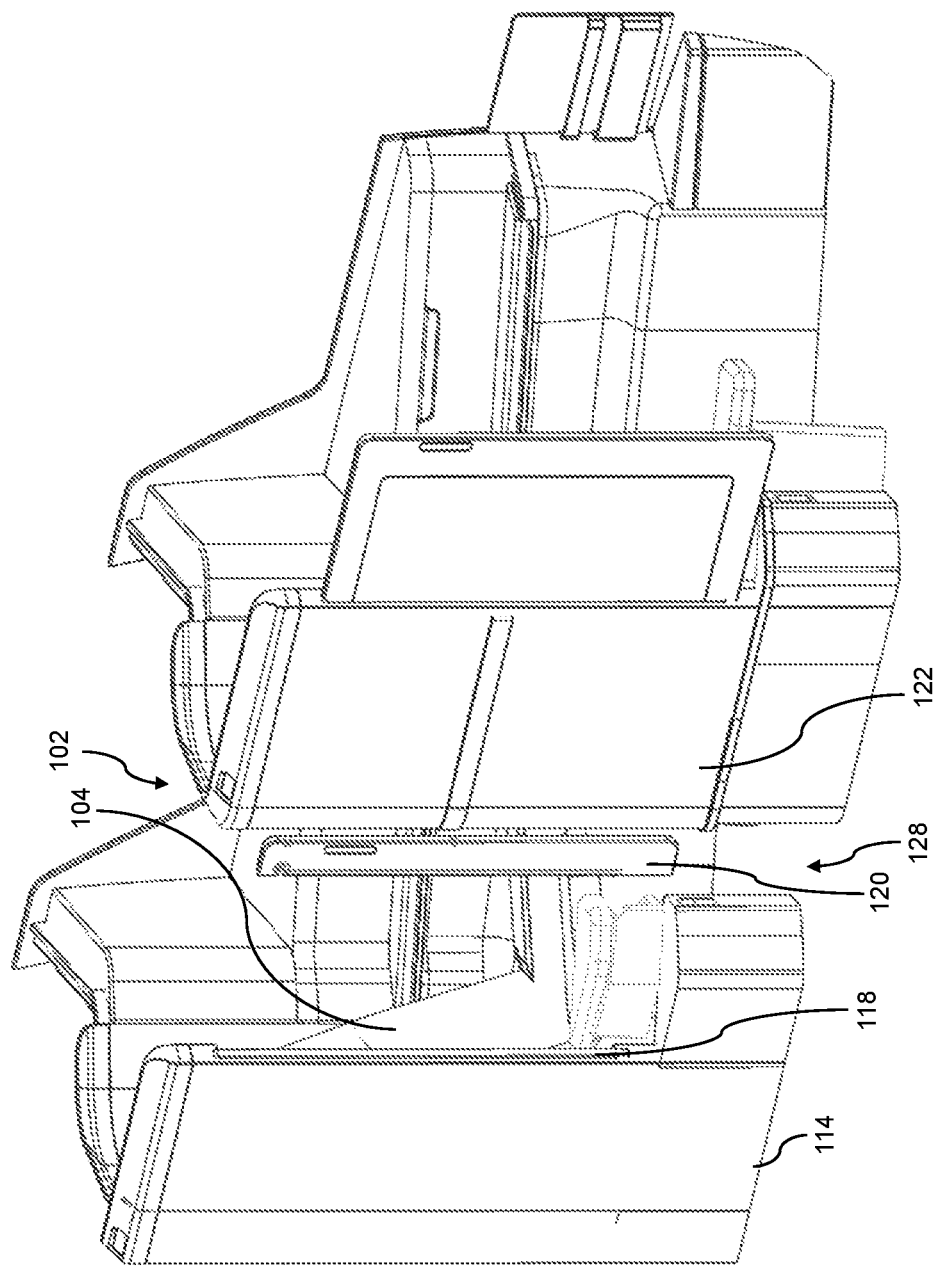
FIG. 5 is a perspective view of the passenger suites of FIG. 1 showing the partition moved aft and the door open to form a second entrance for accessible use.
Figure 6:
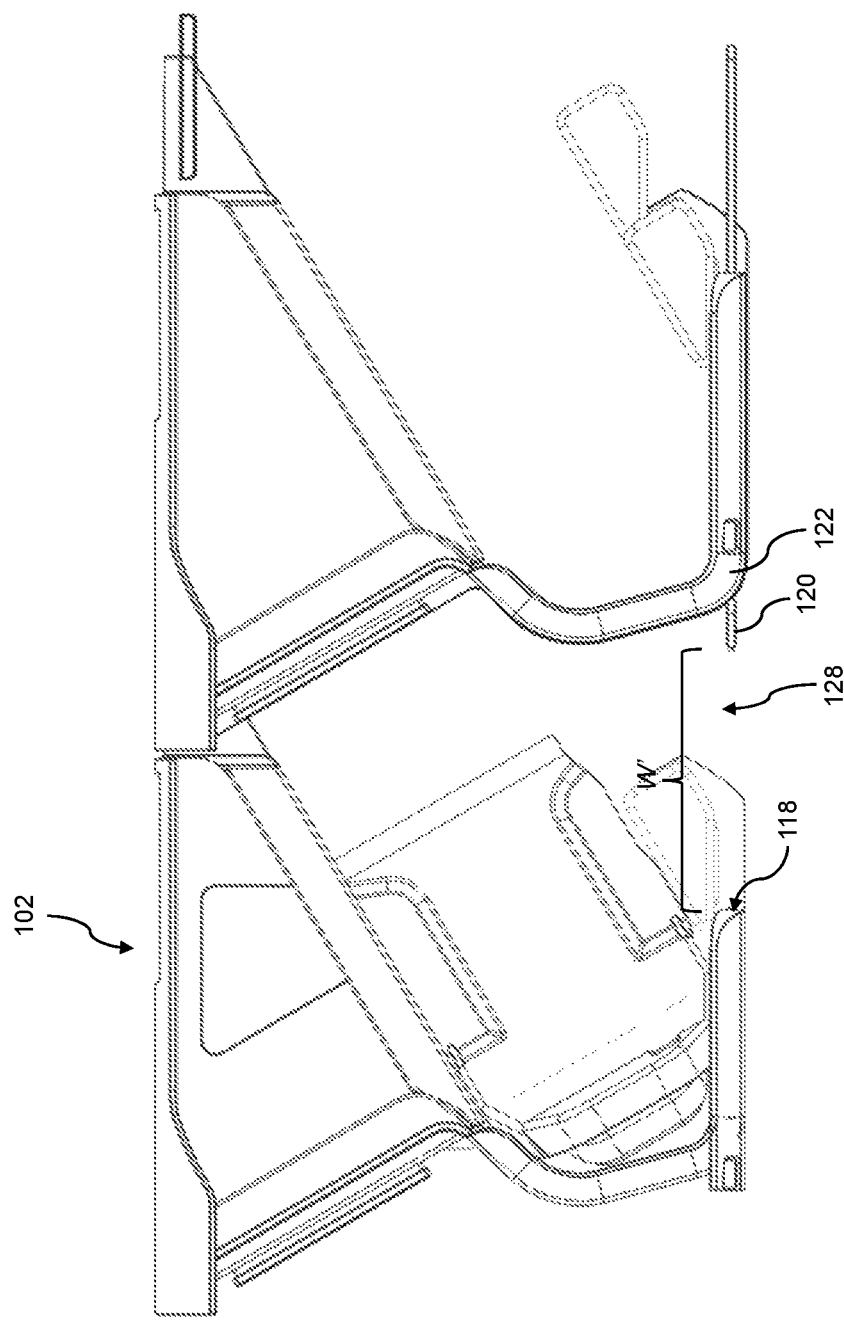
FIG. 6 is an overhead view of FIG. 5.

Referring to FIGS. 5 and 6, in a second operating mode, the movable partition wall 114 moves relative to the passenger seat 104 and further apart from the longitudinally adjacent partition wall 122 to form a second entrance 128 for accessible use. The second entrance 128 is positioned further aft as compared to the first entrance (126 in FIGS. 3 and 4) revealing more of the passenger seat 104 to facilitate lateral transfer. The second entrance has a width dimension w' which is larger than the width dimension w. Comparing the second entrance 128 to the first entrance 126, the second entrance is not only larger but is longitudinally shifted relative to the suite 102. As shown, moving the partition wall 114 aft clears additional space alongside the seat 104 for passenger transfer from the aisle, for instance from a wheelchair to the seat.

As shown, in the second operating mode the first door 118 may decouple from the second door 120 such that the second door remains attached or in otherwise close proximity to the partition wall 122 of the adjacent suite. The first door 118 may stow within the shifted partition wall 114. Mechanisms for shifting the movable portion of the partition wall 114 relative to stationary portions of the partition wall 106 may be conventional, such as guide tracks attached to the floor or the stationary partition wall defining engagement surfaces on which sliding or rolling members affixed to the movable partition wall engage.

Figure 7:
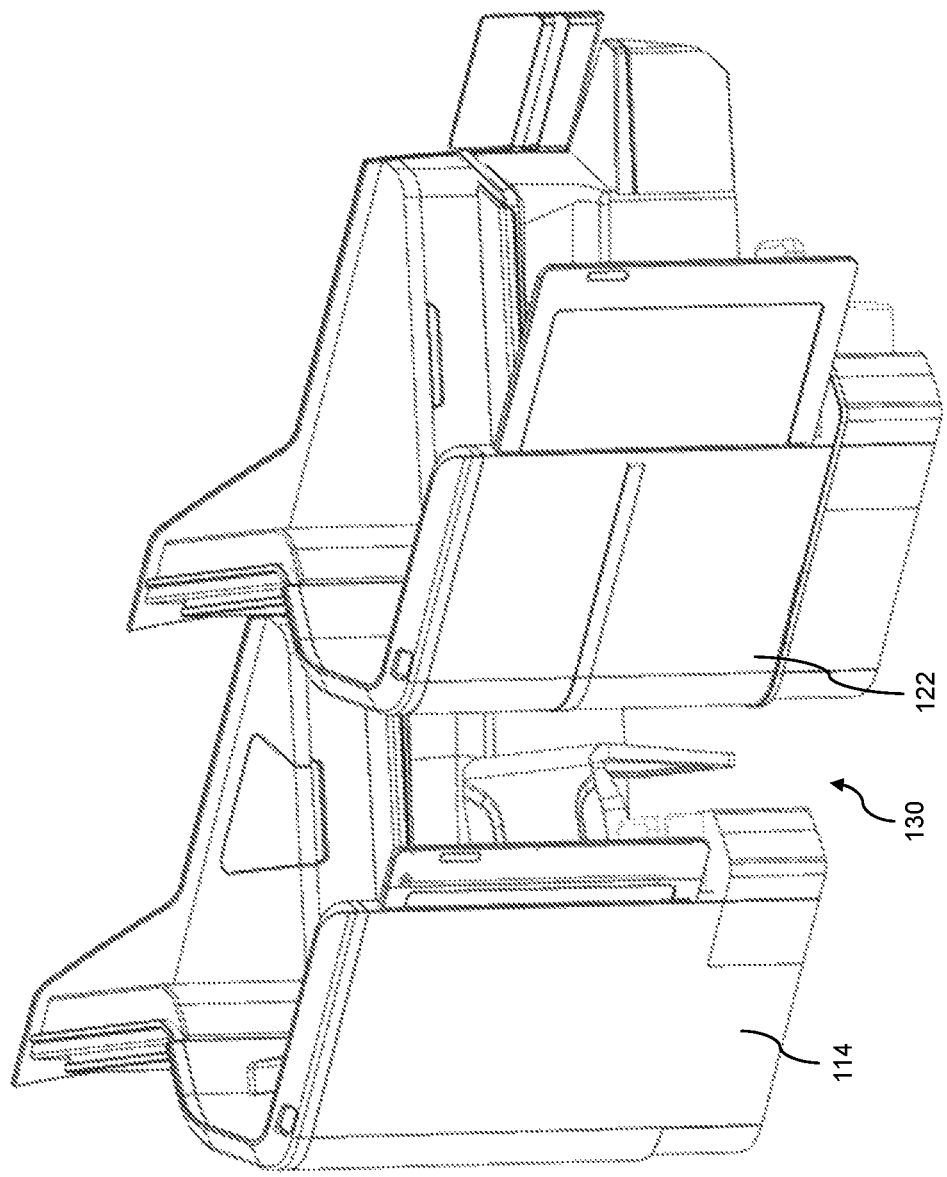
FIG. 7 is a perspective view of the passenger suites of FIG. 1 showing a modified entrance with the door open.
Figure 8:
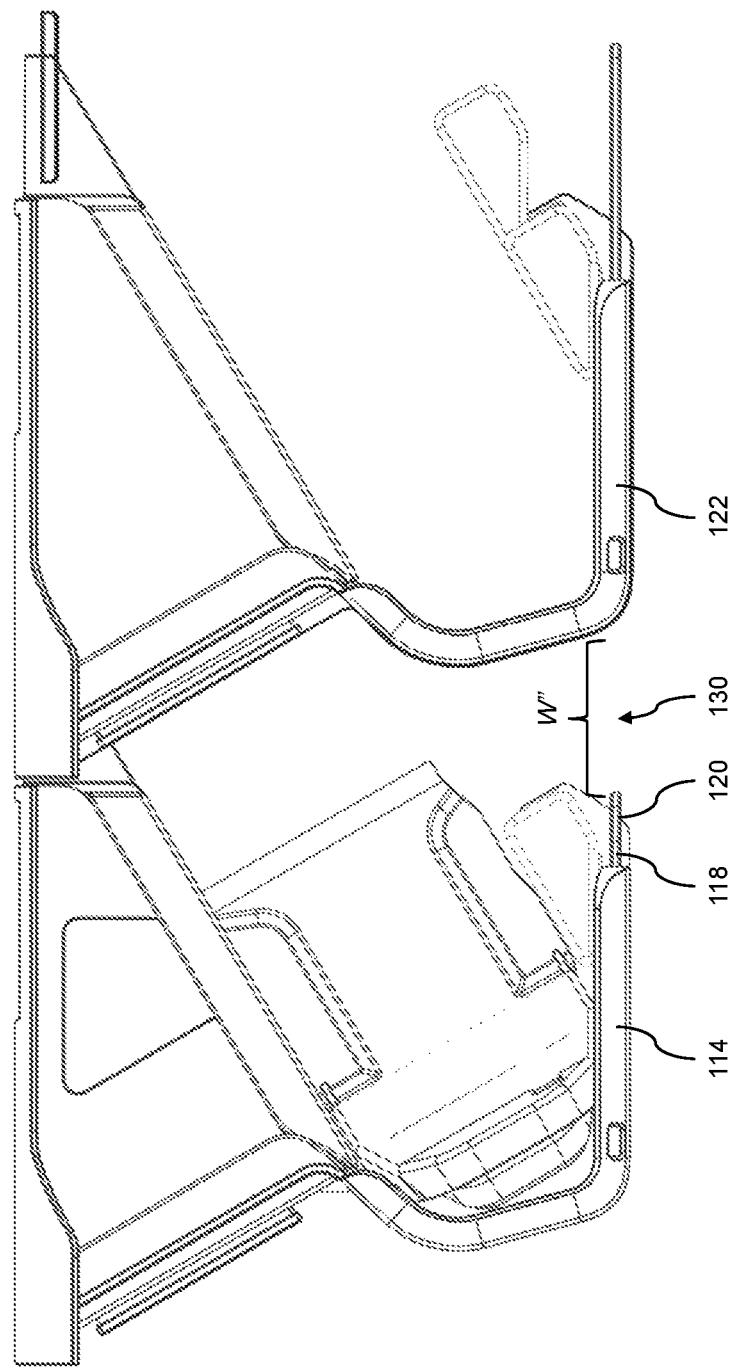
FIG. 8 is an overhead view of FIG. 7.

Referring to FIGS. 7 and 8, in a modified version of the first operating mode, or as an intermediate mode between the standard and accessible operating modes, the movable partition wall 114 remains stationary and the first and second door portions 118, 120 are coupled and move together. As shown, the movable partition wall 114 defines an interior space for receiving at least the first door portion 118. Alternatively, the coupled first and second door portions 118, 120 may move to a position alongside the movable partition wall 114, for instance to the inside of the partition wall apart from the aisle.

In the open-door condition shown in FIGS. 7 and 8, a different first entrance 130 may be formed between the second door portion 120 and the adjacent partition wall 122. The different first entrance has a width w" which may or may not correspond to the width w depending on the amount of aft travel of the doors 118, 120 relative to the movable partition wall 114. In some embodiments, the modified first entrance corresponds to standard use for passengers without mobility limitations. As shown, when open, a minor portion of the first door portion 118 and the entirety of the second door portion 120 are positioned outside of the movable partition wall 114.

Figure 9:
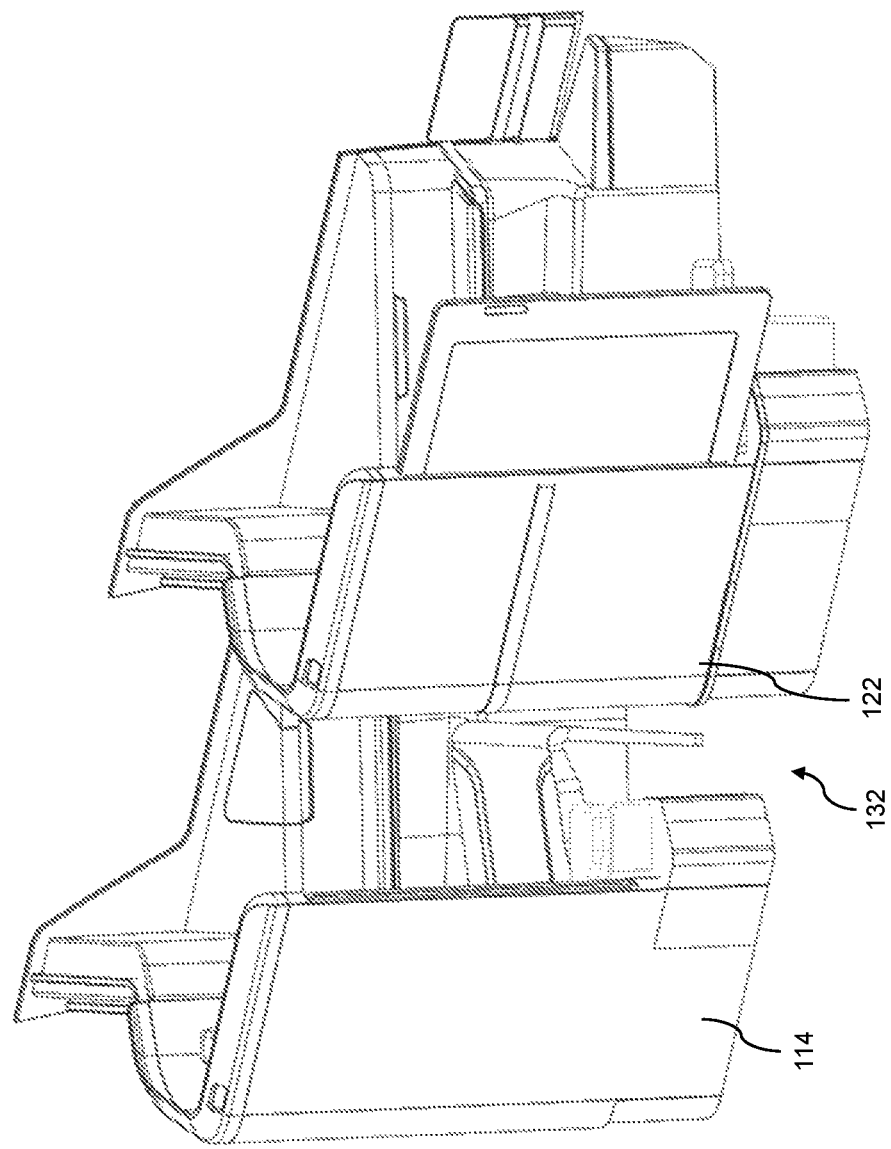
FIG. 9 is a perspective view of the passenger suites of FIG. 1 showing a modified entrance with door full open.
Figure 10:
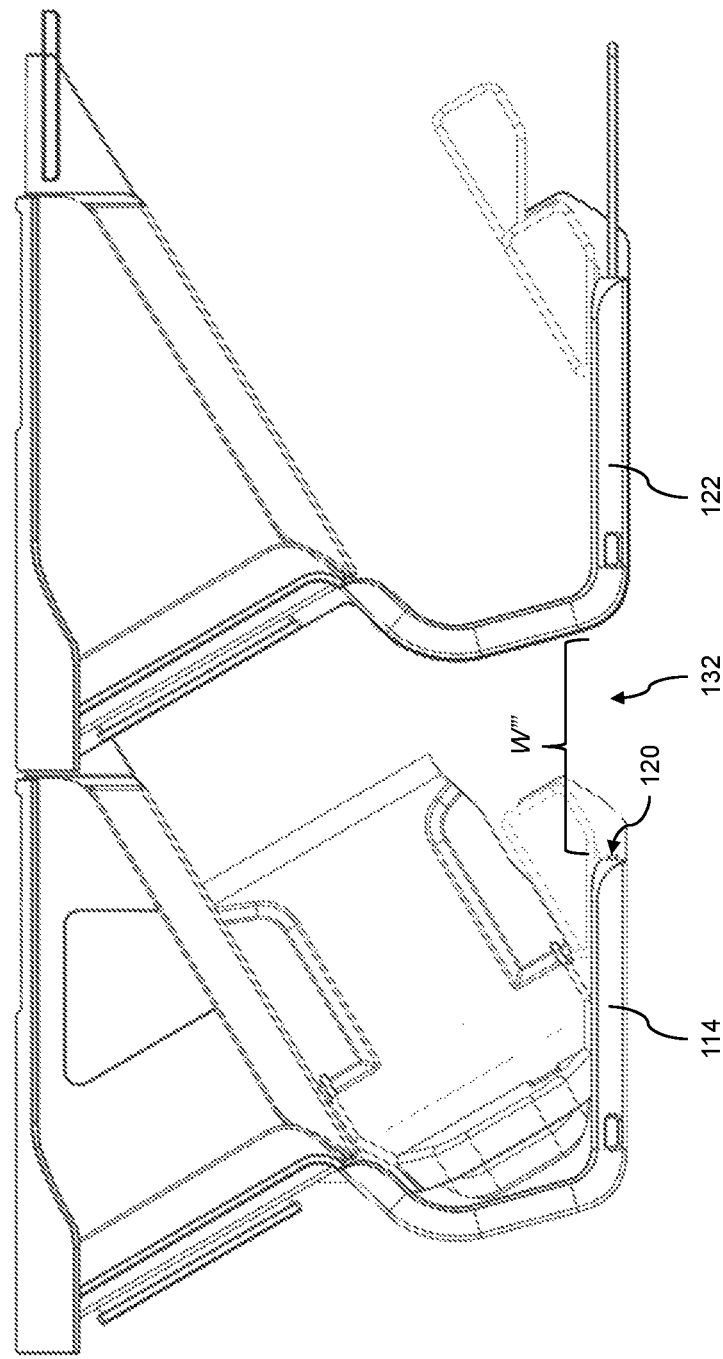
FIG. 10 is an overhead view of FIG. 9.

FIGS. 9 and 10 show yet another modified entrance 132 formed between the movable partition wall 114 and the adjacent partition wall 122. The modified entrance 132 defines a width dimension w'" which may be greater or equal to at least one of the above widths. In some embodiments, the entrance 130 corresponds to an accessible operating mode in which the reduced mobility passenger requires greater clearance between the passenger seat 104 and forward partition wall 122 as compared to alongside the passenger seat. As shown, the first door portion is received within the wall as is most of the second door portion 120, thereby expanding the entrance width dimension. In a further operating mode, the movable partition wall 114 may shift aft to form an entrance extending between the spaced partition wall 122 and the facing edge of the shifted partition wall 114.

The door assembly as described above is reconfigurable to form different entrances depending on different combinations of the movable partition wall position, coupled state of the first and second door portions, and amount of aft travel of the at least one door portion. For example, the drawing figures show at least one standard operating mode and at least one accessible operating mode. The at least one standard operating mode is achievable by different combinations of coupled and uncoupled states of the first and second door portions and travel relative to the stationary partition wall. The at least one accessible operating mode is achievable by different combinations of partition wall movement, door coupling states and door movements. In all embodiments, the first and second entrances for respective standard and accessible use are different entrances, and not merely one being an extension of the other.

In a non-limiting use example, the first opening may be formed by maintaining the first position of the movable partition wall and opening at least the first door portion. To create the second opening, the movable partition wall is moved from the first position to the second position and at least the first door portion is moved to the open state. The second opening is not an expansion of the first opening but instead is a newly formed opening longitudinally shifted relative to the first opening. For example, the first opening may extend from the forward wall to about the forward end of the passenger seat, whereas the second opening may extend from about the side of the passenger seat to about the forward wall. In use, the first door may slide the same amount in both operating modes, but once in the closed state, the first and second door portions may be coupled and slide to enlarge the opening further to increase access for reduced mobility passengers.

Figure 11B:
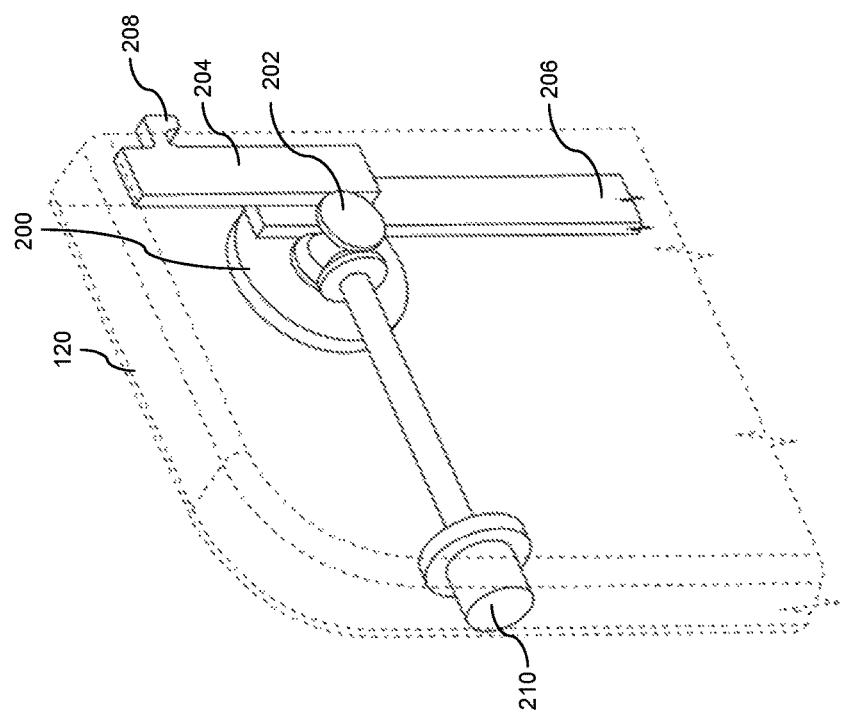
FIGS. 11A and 11B illustrate an exemplary latch mechanism associated with the door assembly of the present disclosure.
Figure 11A:

FIGS. 11A and 11B illustrate an exemplary mechanism for coupling and uncoupling the first and second door portions and for attaching and detaching the second door portion 120 to the adjacent partition wall. In the mechanism shown, a rotating latch 200 and bevel gear arrangement 202 provided on the second door portion 120 operates to drive an upper rail 204 and a lower rail 206 in opposite directions. A hook 208 formed on each of the upper and lower rails 204, 206 engages in a respective catch formed on at least one of the first door portion and the spaced partition wall or other structure supporting the uncoupled second door portion. A magnetic lock 210, for example, rotates 90 degrees to attract the first door portion to couple the door portions, and rotates a further 90 degrees to uncouple the first and second door portions. Another mechanism may include a bolt action mechanism wherein a shaft defining sliding bayonet locks slides and rotates to uncouple the door portions and/or the second door portion from its support structure. In further embodiments, the door assembly may be equipped with an emergency release mechanism.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:
1. A door assembly for use in an aircraft or other conveyance, comprising:
    a partition wall configured to move between a first position and a second position;
    a sliding door supported by the partition wall, the sliding door including a first door portion and a second door portion; and a latch mechanism operable to couple the first and second door portions;

wherein:

in a first operating mode of the door assembly, the partition wall is maintained in the first position and the sliding door moves to an open state to form a first opening;

in a second operating mode of the door assembly, the partition wall is moved from the first position to the second position and the sliding door moves to the open state to form a second opening different from the first opening;

the second opening is longitudinally shifted relative to the first opening; and motion of each of the partition wall and the sliding door is a translation motion.

2. The door assembly according to claim 1, wherein the first operating mode corresponds to standard use and the second operating mode corresponds to accessible use.

3. The door assembly according to claim 1, wherein the first and second openings have a substantially equal width dimension or wherein a width dimension of the second opening is greater than a width dimension of the first opening.

4. The door assembly according to claim 1, wherein in the first operating mode of the door assembly, the first and second door portions uncouple, and the first door portion moves relative to the second door portion.

5. The door assembly according to claim 1, wherein in the first operating mode of the door assembly, the first and second door portions are coupled and move together relative to the partition wall.

6. The door assembly according to claim 1, wherein in the second operating mode of the door assembly, the first and second door portions uncouple, and the first door portion moves relative to the second door portion.

7. The door assembly according to claim 1, wherein in the second operating mode of the door assembly, the first and second door portions are coupled and move together relative to the partition wall.

8. The door assembly according to claim 1, wherein the latch mechanism includes a rotating latch and a bevel gear arrangement.

9. A passenger suite, comprising:

a first partition wall defining an interior space;

a passenger seat positioned in the interior space;

an entrance formed between the first partition wall and a second partition wall; and a door assembly, comprising:

a movable partition wall configured to move between a first position and a second position;

a sliding door supported by the movable partition wall, the sliding door including a first door portion and a second door portion; and a latch mechanism operable to couple the first and second door portions;

wherein:

in a first operating mode of the door assembly, the movable partition wall is maintained in the first position and the sliding door moves to an open state to form a first opening;

in a second operating mode of the door assembly, the movable partition wall is moved from the first position to the second position and the sliding door moves to the open state to form a second opening different from the first opening; and the second opening is longitudinally shifted relative to the first opening; and motion of each of the movable partition wall and the sliding door is a translation motion.

10. The passenger suite according to claim 9, wherein the first operating mode corresponds to standard use and the second operating mode corresponds to accessible use.

11. The passenger suite according to claim 9, wherein the first and second openings have a substantially equal width dimension or wherein a width dimension of the second opening is greater than a width dimension of the first opening.

12. The passenger suite according to claim 9, wherein in the first operating mode of the door assembly, the first and second door portions uncouple, and the first door portion moves relative to the second door portion.

13. The passenger suite according to claim 9, wherein in the first operating mode of the door assembly, the first and second door portions are coupled and move together relative to the movable partition wall.

14. The passenger suite according to claim 9, wherein in the second operating mode of the door assembly, the first and second door portions uncouple, and the first door portion moves relative to the second door portion.

15. The passenger suite according to claim 9, wherein in the second operating mode of the door assembly, the first and second door portions are coupled and move together relative to the movable partition wall.

* * * * *